United States Patent Office 3,770,654
Patented Nov. 6, 1973

3,770,654
NEMATIC LIQUID CRYSTAL
Yoshio Katagiri and Yoshio Miyata, Sendai, and Osamu Nagasaki, Narashino, Japan, assignors to Kabushiki Kaisha Daini Seikosha and Kabushiki Kaisha Hattori Tokeiten, both of Tokyo, Japan
No Drawing. Filed Apr. 27, 1971, Ser. No. 137,980
Claims priority, application Japan, May 2, 1970, 45/37,201
Int. Cl. C09k 3/00; C07c 69/00
U.S. Cl. 252—408                                4 Claims

ABSTRACT OF THE DISCLOSURE

Nematic liquid crystal compositions having a liquid crystal range including ambient temperature are disclosed. The compositions include at least one compound having the general chemical formula

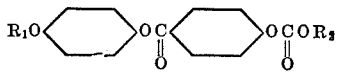

wherein $R_1$ and $R_2$ are alkyl groups having the general formula $CH_3(CH_2)_n$, and at least one compound having the general chemical formula

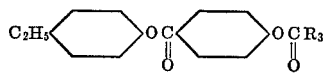

wherein $R_3$ is either n-$C_4H_9$ or n-$C_5H_{11}$.

BACKGROUND OF THE INVENTION

Liquid crystals were discovered in 1888 and are generally classified as smectic, nematic or cholesteric. Substances in the liquid crystalline state are fluids but nevertheless have a number of properties corresponding to the crystalline state. In particular, they are optically anisotropic. Compounds which enter the liquid crystalline state as the result of temperature change are termed thermotropic. An example of a well-known nematic crystal is p-azoxyanisole, which is a solid crystalline material below 117° C. and becomes a liquid nematic crystal in the temperature range of 117–134° C. Above 134° C. the material becomes liquid and loses all crystalline properties.

An important feature of the nematic liquid crystals are that they scatter light when subjected to a strong electric field; this makes them suitable for use in digital display devices.

Relatively few conventional organic nematic liquid crystals are known which are in the liquid crystalline state at room temperature. In general, most of the nematic liquid crystals are in the mesomorphic temperature range at substantially higher temperatures. For example, the mesomorphic temperature range of the well-known nematic liquid crystal anisylidene p-aminophenyl acetate, commonly termed APAPA, is 83–110° C., and that of p-azoxyanisole is 117–134° C. For use in digital display devices, it is highly preferable that the mesomorphic temperature range include room temperature. Numerous organic compounds have been reported as being nematic liquid crystals in compendia such as Landolt-Bornstein 1960, volume 11, part 2a, page 266-ff; however, the mesomorphic temperature ranges of these materials are so high that utilization of such materials in digital display devices would be very difficult. Mixing of two or more such compounds would lower the melting point in general, and similarly would result in a lower mesomorphic temperature range. However, the mesomorphic temperature ranges of the reported compounds are so high that it would be difficult to obtain a mesomorphic temperature range in the vicinity of room temperature even by mixing.

A further point is that materials in the nematic mesomorphic state tend to supercool, so that some of the materials reported as having a mesomorphic temperature range near room temperature are actually in an unstable state. Consequently, on storage, the liquid crystal would be converted to a solid crystal.

A number of nematic liquid crystals having mesomorphic temperature ranges which include room temperature are given in the copending application filed Apr. 7, 1971 in the names of Yashio Katagiri and Yoshio Miyata and having a common assignee with this application.

SUMMARY OF THE INVENTION

Liquid crystals having a mesmorphic temperature range including room temperature are provided by mixing at least one compound having the general chemical formula,

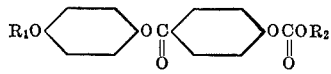

wherein $R_1$ and $R_2$ are $CH_3(CH_2)_n$ with at least one compound having the general chemical formula,

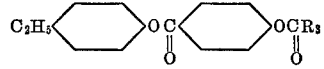

wherein $R_3$ is n-$C_4H_9$ or n-$C_5H_{11}$.

Compounds of the types described are strongly soluble in each other and yield stable nematic liquid crystals at room temperature. Moreover, they are readily synthesized at relatively low cost.

Accordingly, it is an object of the present invention to provide nematic liquid crystal compositions which are in the mesomorphic state at room temperature.

Another object of the invention is to provide nematic liquid crystal compositions which are in the nematic state at room temperature and are stable for long periods of time.

Yet another object of the invention is to provide nematic liquid crystal compositions which are in the mesomorphic state at room temperature and which are readily synthesized and are relatively low in cost.

Yet another object of the present invention is to provide nematic liquid crystal compositions suitable for use in digital display devices, and easily prepared from readily available materials so that the final product is low in cost and economical for use.

Still other objects and advantages of the invention will in part be obvious and will in part be apparent from the specification.

The invention accordingly comprises a composition of matter possessing the characteristics, properties, and the relation of constituents which will be exemplified in the composition hereinafter described, and the scope of the invention will be indicated in the calims.

PREFERRED EMBODIMENTS OF THE INVENTION

To provide compositions in accord with the present invention, two types of compounds must be synthesized. The preparation of compounds of the first type listed above is exemplified by the synthesis of

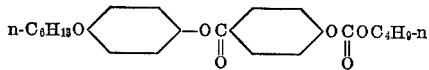

which is prepared as follows:

p-Hydroxybenzoic acid (1 mole) was dissolved in one litre of 2 M aqueous sodium hydroxide. To this mixture was added normal butyl chloroformate in slight excess under vigorous agitation at room temperature. The mixture was then acidified with acetic acid. Benzoic acid p-n-butyl carbonate was separated off, washed and dried.

Thionyl chloride (1.2 moles) was added to the solid. After reaction the excess thionyl chloride was eliminated. After cooling, p-n-hexyloxyphenol (1 mole) and pyridine (1 mole) were added. The mixture was poured into 1 litre of water and the solid ester was recrystalized from ethyl alcohol.

The preparation of compounds of the second type is exemplified by the synthesis of the following compound,

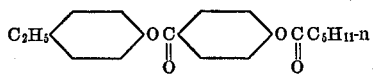

p-Hydroxybenzoic acid (1 mole) is dissolved in 1 litre of 2 M aqueous sodium hydroxide. One mole of n-caproyl chloride is added slowly at room temperature with vigorous agitation. At the finish of the addition, the solution is made acid with acetic acid. The benzoic acid p-n-caproate is separated, washed and dried. Thionyl chloride (1.2 mole) is added to benzoic acid p-n-caproate (1 mole), after which the excess thionyl chloride is eliminated and p-ethylphenol (1 mole) and pyridine (1 mole) are added with cooling. The liquid is poured into 1 litre of water and the solid is filtered off. The ester is recrystallized from ethanol.

Following are compositions in accord with the present invention.

EXAMPLE 1

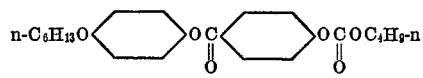

having a nematic mesomorphic temperature range of 38–75° C., and

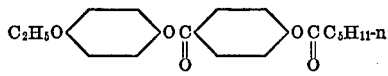

having a nematic mesomorphic temperature range of 35–38° C., at a mole ratio 1:1. The colorless, transparent nematic liquid crystal product is stable in the range of 5–59° C. The product was placed between Nesa glasses and subjected to a direct current electric field of $10^4$ v./cm. Strong light scattering was observed.

EXAMPLE 2

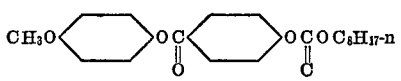

having a measured mesomorphic temperature range of 37–65° C. and

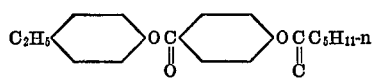

at a mole ratio of 1:1. The nematic liquid crystal product was stable at 8–57° C. Strong light scattering was observed when the material was placed between Nesa glasses and a direct current electric field of $10^4$ v./cm. was applied.

EXAMPLE 3

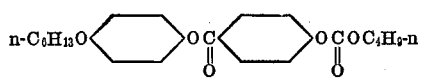

and

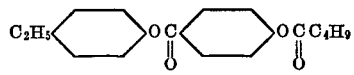

having a measured nematic mesomorphic temperature range of 41–43° C. at a mole ratio of 1:1. The nematic liquid crystal product was stable at 10–63° C. Strong light scattering was observed when the material was tested as above.

As noted above, $R_3$ is restricted to n-$C_4H_9$ and n-$C_5H_{11}$ because it has been found that compounds in which $R_3$ is either shorter than $C_4$ or longer than $C_5$ give higher nematic mesomorphic liquid crystal ranges.

It will thus be seen that the objects set forth above, among those made apparent from the preceding description, are efficiently attained and, since certain changes may be made in the above composition of matter without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A nematic liquid crystal composition, comprising about 50 mole percent of at least one compound having the general chemical formula,

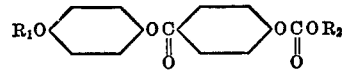

wherein $R_1$ is a saturated alkyl group having 1 to 8 carbon atoms and $R_2$ is a saturated alkyl group having 3 to 10 carbon atoms and about 50 mole percent of at least one group having the general chemical formula,

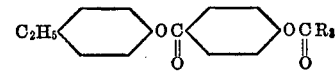

wherein $R_3$ is selected from the group consisting of n-$C_4H_9$ and $C_5H_{11}$.

2. Composition as defined in claim 1, wherein

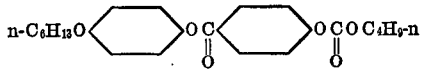

is combined with

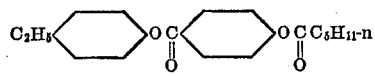

at a mole ratio of 1:1.

3. Composition as defined in claim 1, wherein

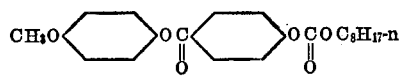

is combined with

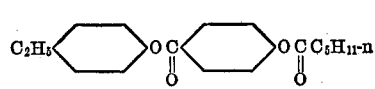

at a mole ratio of 1:1.

4. Composition as defined in claim 1, wherein

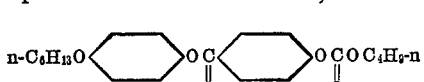

is combined with

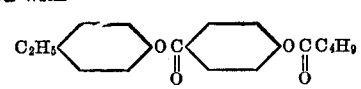

at a mole ratio of 1:1.

(References on following page)

References Cited

UNITED STATES PATENTS 3,675,987   7/1972   Rafuse _____ 350—160

FOREIGN PATENTS 1,170,486   11/1969   Great Britain.

OTHER REFERENCES

Russian Chemical Reviews, "Chemical Characteristics, Structure and Properties of Liquid Crystal," Usol To eva et al., pp. 495–507, September 1963.

C&EN, "Liquid Crystals Draw Intense Interest," pp. 20–23, November 1971.

GEORGE F. LESMES, Primary Examiner

M. B. WITTENBERG, Assistant Examiner

U.S. Cl. X.R.

23—230 LC; 350—160 LC; 260—463